United States Patent [19]

Goebel et al.

[11] Patent Number: 4,562,094
[45] Date of Patent: Dec. 31, 1985

[54] METHOD OF MANUFACTURING POROUS CARBON STRUCTURES

[75] Inventors: Franz Goebel, Sudbury; Timothy B. Haskins, Concord; David C. Batson, Melrose, all of Mass.

[73] Assignee: GTE Government Systems Corporation, Stamford, Conn.

[21] Appl. No.: 719,598

[22] Filed: Apr. 3, 1985

[51] Int. Cl.[4] .......................... B05D 5/12; B05D 3/02
[52] U.S. Cl. ..................................... 427/115; 252/511; 427/243; 427/388.2; 427/388.5; 427/389.8
[58] Field of Search ................... 427/115, 243, 388.5, 427/388.2, 389.8, 385.5; 252/511

[56] References Cited

U.S. PATENT DOCUMENTS

| | | | |
|---|---|---|---|
| 2,940,874 | 6/1960 | Barnes | 427/115 |
| 3,544,379 | 12/1970 | Miller | 427/115 X |
| 4,060,668 | 11/1977 | Goebel | 429/122 |
| 4,235,748 | 11/1980 | Berchielli et al. | 427/115 X |
| 4,296,187 | 10/1981 | Barnes et al. | 429/105 |
| 4,369,212 | 1/1983 | Rogers et al. | 427/352 |
| 4,457,953 | 7/1984 | McIntyre et al. | 427/113 |

*Primary Examiner*—Thurman K. Page
*Attorney, Agent, or Firm*—J. Stephen Yeo

[57] ABSTRACT

Trichlorotrifluoromethane is used as a vehicle to apply carbon and a binder to a substrate. Carbon black and tetrafluoroethylene are suspended in liquid trichlorotrifluoroethane to form a slurry. A layer of the slurry is deposited on a substrate. The trichlorofluoromethane is evaporated leaving a porous residue of carbon and tetrafluoroethylene on the substrate.

1 Claim, No Drawings

METHOD OF MANUFACTURING POROUS CARBON STRUCTURES

BACKGROUND OF THE INVENTION

This invention is concerned with the manufacture of porous carbon structures and more particularly the manufacture of such structures for use in electrochemical cells.

Primary electrochemical cells are utilized for a wide variety of applications and are commonly available in a large assortment of sizes and shapes. A common design of an electrochemical cell includes an electrochemical system comprising an anode, a porous carbon cathode structure separated from the anode by a porous separator, and an electrolytic solution in contact with the aforementioned cell components. In a preferred construction of a cell, the anode includes an oxidizable active alkali metal such as lithium the carbon cathode structure includes an aggregation of porous carbon globules or conglomerates, the porous separator is of fiberglass, and the electrolytic solution is a cathodelectrolyte solution including a reducible soluble cathode such as thionyl chloride and an electrolyte solute such as lithium tetrachloroaluminate dissolved in the thionyl chloride.

Porous carbon cathode structures have been produced by spraying or otherwise depositing a carbon slurry material onto a thin metallic or insulating substrate which is then processed (e.g., by drying and curing operations) to achieve a carbon thickness on the metallic substrate in a range of 0.001 to 0.005 inch.

In U.S. Pat. No. 4,296,187, Barnes et al divulges a method for fabricating an integrated carbon structure. In accordance with the Barnes et al patent, a quantity of a wet carbon slurry material is first deposited onto a porous sheet of an electrically-nonconductive substrate material, e.g., fiberglass. The quantity of wet carbon slurry material is then worked onto and across the porous sheet of electrically-nonconductive substrate material to achieve a layer of desired thickness for the carbon slurry material and to cause a portion of the carbon slurry material to diffuse into the surface of the porous sheet of substrate material and permanently adhere to and unite with a portion of the sheet of substrate material in an integrated, interlocking fashion. The sheet of substrate material having the layer of carbon slurry material integrated therewith is then dried to cause the layer of carbon slurry material to dry and shrink to the form of a layer of carbon plaque comprising an aggregation of porous carbon globules and having a network of cracks produced therethrough in a random pattern as a result of the shrinkage during drying. The layer of carbon plaque is then reworked to close cracks at the upper surface of the layer of carbon plaque while simultaneously maintaining a desired thickness for said layer. An integrated carbon/insulator structure of a desired size and configuration may then be cut out from the sheet of substrate material having the reworked layer of carbon plaque interlocked therewith.

The wet carbon slurry material divulged by Barnes et al is a mixture of particulate carbon black and tetrafluoroethlyne suspended in water or isopropyl alcohol. It is critical that both water and isopropyl alcohol be completely removed from the carbon structure before assembly of the structure into an electrochemical cell, particularly where highly reactive components such as lithium and thionyl chloride are present. This necessitated prolonged heating or vacuum cycles which increased the cost of the product.

It is an object of the invention to provide a method of fabricating porous carbon structures without the use of water or isopropyl alcohol.

DESCRIPTION OF THE INVENTION

As a feature of the invention, trichlorotrifluoroethane (sold under the trademark Freon TF by Dupont) is used as a vehicle to apply carbon and a binder to a substrate.

Preferably 100 parts (by weight) of carbon black and 4 parts of finely divided tetrafluoroethylene (sold under the trademark Teflon) are suspended in 1500 parts of liquid trichlorotrifluoroethane to form a thick slurry.

A layer of the slurry is deposited upon a substrate. The substrate may be a stainless steel sheet, a nickel screen, or woven or unwoven fiberglass for examples.

The trichlorotrifluoroethane is then evaporated from the layer leaving a porous residue of carbon and tetrafluoroethylene on the substrate. The layer may be rolled smooth in the manner described in U.S. Pat. No. 4,296,187.

Trichlorotrifluoromethane has a boiling point of 47.6° C. and is quickly evaporated at moderate temperature without costly ovens or evacuation chambers.

Having described the invention we claim:

1. A method of manufacturing porous carbon structures comprising the steps of:
   a. suspending particulate carbon and tetrafluoroethylene in liquid trichlorotrifluoroethane to form a slurry;
   b. depositing a layer of said slurry on a substrate; and
   c. evaporating said trichlorotrifluoroethane from said layer leaving a porous residue of carbon and tetrafluoroethylene adhered to said substrate.

* * * * *

UNITED STATES PATENT AND TRADEMARK OFFICE
CERTIFICATE OF CORRECTION

PATENT NO. : 4,562,094

DATED : Dec. 31, 1985

INVENTOR(S) : Franz Goebel et al

It is certified that error appears in the above—identified patent and that said Letters Patent is hereby corrected as shown below:

ABSTRACT

Line 1, change "Trichlorotrifluoromethane" to read
—Trichlorotrifluoroethane—.

Line 5, change "trichlorotrifluoromethane" to read
—trichlorotrifluoroethane—.

Column 2, line 39, change Trichlorotrifluoromethane" to read
—Trichlorotrifluoroethane—.

Signed and Sealed this

First Day of April 1986

[SEAL]

Attest:

DONALD J. QUIGG

Attesting Officer

Commissioner of Patents and Trademarks